(12) United States Patent
Hasegawa

(10) Patent No.: US 8,424,506 B2
(45) Date of Patent: Apr. 23, 2013

(54) DIRECT-INJECTION TYPE ENGINE

(75) Inventor: Ryo Hasegawa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 597 days.

(21) Appl. No.: 12/682,376

(22) PCT Filed: Sep. 26, 2008

(86) PCT No.: PCT/JP2008/067973
§ 371 (c)(1),
(2), (4) Date: Apr. 9, 2010

(87) PCT Pub. No.: WO2009/054249
PCT Pub. Date: Apr. 30, 2009

(65) Prior Publication Data
US 2010/0206263 A1    Aug. 19, 2010

(30) Foreign Application Priority Data

Oct. 22, 2007   (JP) ................. 2007-273343

(51) Int. Cl.
*F02F 3/26*   (2006.01)
*F02F 3/00*   (2006.01)

(52) U.S. Cl.
USPC ....................... 123/279; 123/193.6

(58) Field of Classification Search ............... 123/193.4, 123/193.6, 298, 299, 300, 301, 302, 305, 123/306, 307, 276, 279, 280, 282, 285
See application file for complete search history.

(56) References Cited

U.S. PATENT DOCUMENTS 6,499,387 B2 * 12/2002 Bedwell ............ 92/216
6,739,308 B1 * 5/2004 Curtis ............ 123/262
(Continued)

FOREIGN PATENT DOCUMENTS

EP     1 111 224 A2    6/2001
EP     1 605 147 A1    12/2005
(Continued)

OTHER PUBLICATIONS

English-language version International Preliminary Report on Patentability issued in International Patent Application No. PCT/JP2008/067973 on Jun. 17, 2010.

(Continued)

*Primary Examiner* — Stephen K Cronin
*Assistant Examiner* — Sherman Manley
(74) *Attorney, Agent, or Firm* — Oliff & Berridge, PLC

(57) ABSTRACT

A plurality of convex portions are radially fanned and spaced apart from each other by a constant angle in a planar view on a tapered surface of a land portion formed on a bottom surface of a cavity formed in a top portion of a piston. Each convex portion is positioned such that the extending direction of the convex portion aligns with an axis X of a corresponding fuel spray. Thereby, each fuel spray moves forward through a space (convex portion space) between the corresponding convex portion and an inner wall of a cylinder head portion along the extending direction of the corresponding convex portion. When a fuel injection is performed during the latter half of a compression stroke, a pressure in a convex portion space is increased, compared with a pressure in a space of the other portion by the decrease of a ratio of the volume of the convex portion space relative to the volume of the space of the other portion by the proceeding of the compression by the piston. Each fuel spray is circumferentially expanded by the pressure difference.

4 Claims, 8 Drawing Sheets

U.S. PATENT DOCUMENTS

| | | | |
|---|---|---|---|
| 2001/0006056 A1* | 7/2001 | Ichikawa | 123/308 |
| 2006/0090726 A1* | 5/2006 | Meffert et al. | 123/279 |
| 2009/0025681 A1* | 1/2009 | Takahashi et al. | 123/305 |
| 2009/0217905 A1* | 9/2009 | Tanaka et al. | 123/276 |
| 2009/0314253 A1* | 12/2009 | Sono et al. | 123/298 |
| 2010/0206263 A1* | 8/2010 | Hasegawa | 123/279 |
| 2011/0259297 A1* | 10/2011 | Rothbauer et al. | 123/276 |

FOREIGN PATENT DOCUMENTS

| | | |
|---|---|---|
| JP | A-54-071211 | 6/1979 |
| JP | U-56-038121 | 4/1981 |
| JP | A-61-200322 | 9/1986 |
| JP | U-02-003021 | 1/1990 |
| JP | U-02-014423 | 1/1990 |
| JP | U-03-068525 | 7/1991 |
| JP | A-04-031650 | 2/1992 |
| JP | A-04-081519 | 3/1992 |
| JP | U-05-030424 | 4/1993 |
| JP | A-05-141246 | 6/1993 |
| JP | U-05-057317 | 7/1993 |
| JP | A-07-208173 | 8/1995 |
| JP | A-10-184362 | 7/1998 |
| JP | A-2001-241331 | 9/2001 |
| JP | A-2004-169557 | 6/2004 |
| JP | A-2005-030338 | 2/2005 |

OTHER PUBLICATIONS

International Search Report issued in International Patent Application No. PCT/JP2008/067973 on Nov. 4, 2008 (with translation).

* cited by examiner

Fig.4
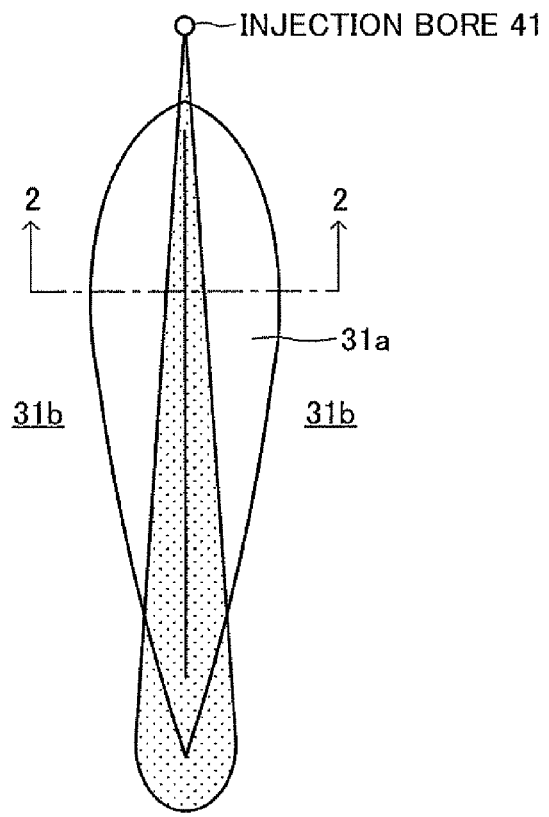
(a)
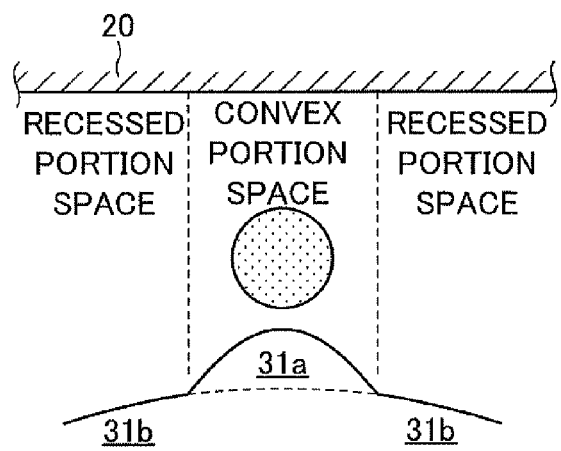
(b)

Fig.5
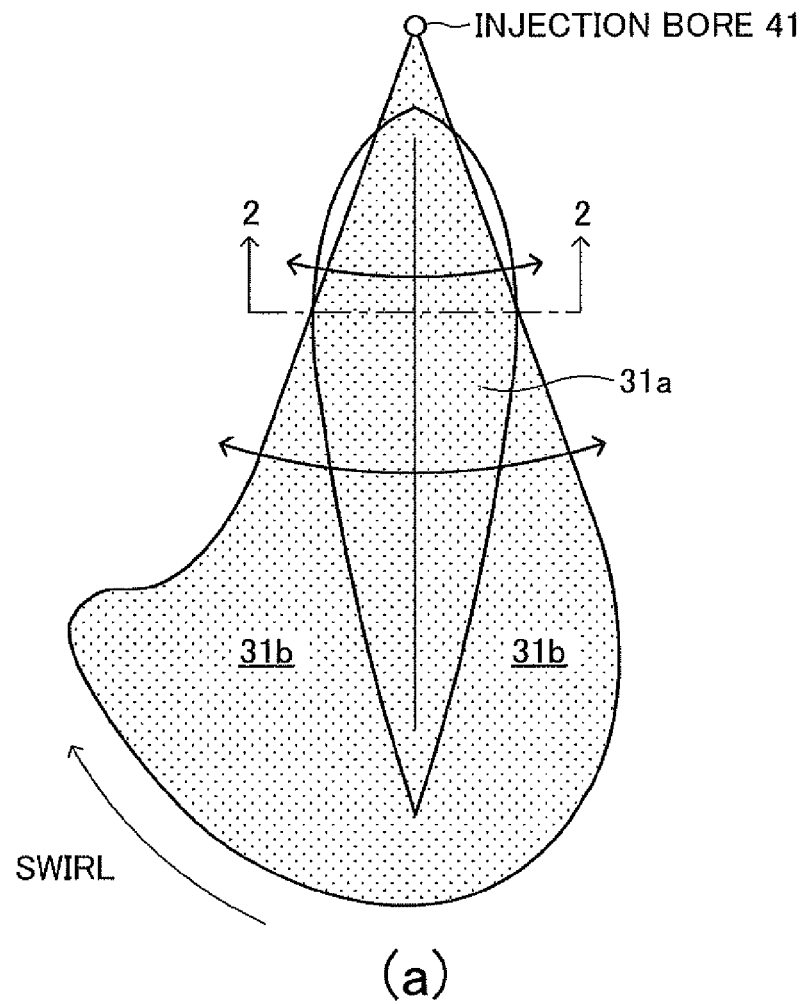
(a)
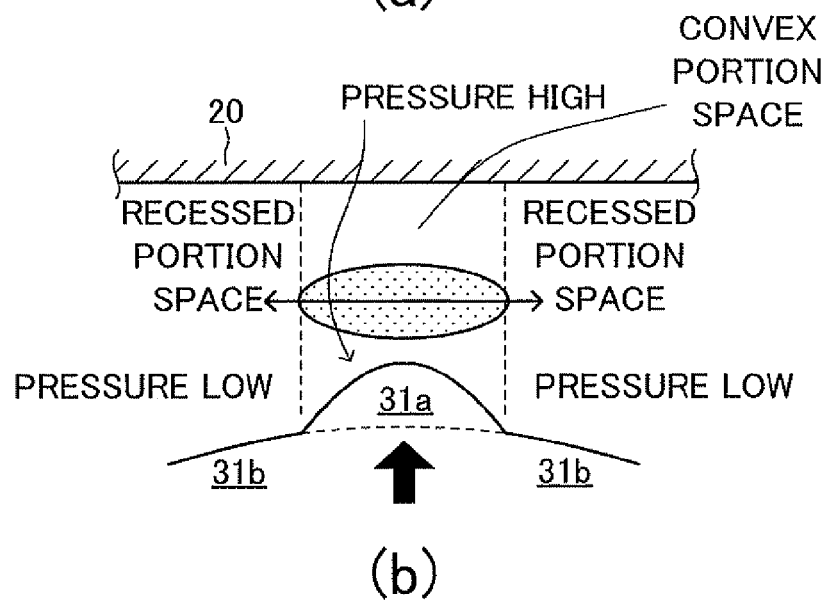
(b)

DIRECT-INJECTION TYPE ENGINE

TECHNICAL FIELD

The invention relates to a direct-injection type engine.

BACKGROUND ART

Conventionally, a direct-injection type engine (a diesel engine or a spark ignition type engine) provided with a fuel injector for injecting fuel directly into a combustion chamber, in which a fuel injection is performed during the latter half of a compression stroke, is known. In this engine, it is effective to facilitate the mixture of fuel and air in the combustion chamber in order to decrease an amount of discharged emission.

To this end, for example, in a diesel engine described in the Unexamined Japanese Patent Publication No. 7-208173, a land portion (a protruded portion) is provided on a central portion of a bottom surface of a cavity provided in a top portion of a piston and a plurality of convex portions extending in a direction perpendicular to an axis of a fuel spray and a plurality of recessed portions extending in the direction perpendicular to the axis of the fuel spray are formed in a stripe pattern on a top surface of the land portion. Thereby, as shown in FIG. 8, a leading portion of the fuel spray positively impinges on the top surface (the surface having the convex and recessed portions) of the land portion. As a result, the diffusion of the leading portion of the fuel spray is facilitated in all directions and the mixture of the fuel and the air can be facilitated.

DISCLOSURE OF THE INVENTION

In the diesel engine described in the above-mentioned Publication, the diffusion of the leading portion of the fuel spray is positively facilitated, while the diffusion of the root portion of the fuel injector (i.e. the portion adjacent to injection bores of the fuel injector) cannot be facilitated (see FIG. 8). In particular, at the root portion of the fuel spray, the diffusion (i.e. the mixture of the fuel and the air) is difficult to be facilitated in a sufficient manner even by using the swirl due to the large fuel density.

In this regard, in the case that the diffusion of the root portion of the fuel spray is not facilitated, for example, at the cold engine start condition, etc., an amount of the discharge of unburned hydrocarbon derived from the root portion may be increased. Further, at the complete warmed engine condition, etc., an amount of the discharge of smoke may be increased due to the incomplete combustion at the root portion.

In addition, as explained above, the leading portion of the fuel spray positively impinges on the top surface of the above-mentioned land portion and therefore the fuel easily adheres with and remains on the top surface of the land portion in a droplet condition. Also according to this, similar to the above, the problems such as the increase of the amount of the discharge of the unburned hydrocarbon at the cold engine start condition, etc. and the increase of the amount of the discharge of the smoke at the complete warmed engine condition, etc. may be raised.

In consideration of the above situation, it would be appear that it is effective to facilitate the diffusion in order to restrict the above-mentioned increase of the amount of the discharge of the unburned hydrocarbon and the smoke, without using the impingement of the root portion of the fuel spray on the wall surface, the diffusion of which root portion is difficult to be facilitated.

In consideration of the above situation, the object of the invention is to provide a direct-injection engine wherein fuel is injected during the latter half of the compression stroke and the diffusion of the root portion of the fuel spray can be facilitated without using the impingement of the root portion of the fuel spray on the wall surface.

A direct-injection type engine according to the invention comprises a combustion chamber defined and formed by at least a cylinder head portion and a top portion of a piston, and a fuel injector for injecting fuel directly into the combustion chamber.

The feature of the direct-injection type engine according to the invention is that a convex portion extending in the direction along an axis of fuel spray formed by fuel injection from the fuel injector is formed in the top portion of the piston such that the fuel spray moves forward between the convex portion and an inner wall of the cylinder head portion in the extending direction of the convex portion. In other words, a recessed portion is formed in a portion of the top portion of the piston other than the convex portion. Below, a space between the convex portion and the inner wall of the cylinder head portion will be referred to as "convex portion space" and a space between the recessed portion and the inner wall of the cylinder head portion will be referred to as "recessed portion space". It is preferred that the fuel injector is positioned and set such that a fuel spray does not directly contact to the convex portion.

In the case that a plurality of the fuel sprays are formed by the fuel injection from the fuel injector in the directions which are different from each other, it is preferred that the convex portions are formed relative to the fuel sprays, respectively such that each convex portion extends in a direction along the axis of the corresponding fuel spray and the corresponding fuel spray moves forward between the convex portion and the inner wall of the cylinder head in the extending direction of the convex portion. In this case, the convex portions and the recessed portions are alternately formed and arranged in the top portion of the piston.

As explained above, when the convex portions and the recessed portions are formed in the top portion of the piston, as the top portion of the piston approaches to the inner wall of the cylinder head portion during the compression stroke, a ratio of the volume of the convex portion space relative to that of the recessed portion space is progressively decreased. As a result, the pressure in the convex portion space is increased, compared with the pressure in the recessed portion space. A flow of the gas occurs by the pressure difference in a direction from the convex portion space toward the recessed portion space (i.e. a direction perpendicular to a direction of the reciprocation of the piston, a circumferential direction and a traverse direction).

Accordingly, in the above-explained constitution, when a fuel injection is performed during the latter half of the compression stroke, the fuel spray formed so as to move forward through the convex portion space in the extending direction of the convex portion, is expanded in the direction perpendicular to the direction of the reciprocation of the piston (the circumferential and traverse direction) by the above-mentioned "flow of the gas from the convex portion space toward the recessed portion space". As a result, the diffusion of the fuel spray (the root portion thereof is included) can be positively facilitated.

That is, according to the above-explained constitution, the diffusion of the fuel spray (in particular, the root portion of the fuel spray) can be facilitated by using the "flow of the gas from the convex portion space toward the recessed portion space", without using the impingement of the fuel spray (in particular, the root portion of the fuel spray) on the wall surface. In addition, the rapid change of the velocity of the "flow of the gas from the convex portion space toward the recessed portion space" can occur and as a result, the turbulence of the gas can be facilitated (the area adjacent to the injection bores of the fuel injector is included). Thereby, the fuel spray (the root portion thereof is included) is expanded in the longitudinal direction (in the direction of the reciprocation of the piston) and therefore the diffusion of the root portion of the fuel spray can be facilitated.

In the above-explained direct-injection type engine according to the invention, it is preferred that a cavity is formed in the top portion of the piston and the convex portion is formed on a bottom surface of the cavity. According to this, a flow of the gas (a squish flow) is formed, in particular, adjacent to a side wall of the combustion chamber by the so-called squish effect. Thereby, in particular, the diffusion of the leading portion of the fuel spray can be positively facilitated. In the case that a land portion (a protruded portion) is formed on the bottom surface of the cavity, the convex portion (and the recessed portion) may be formed in the top portion of the land portion.

Further, in the above-explained direct-injection type engine according to the invention, it is preferred that the convex portion is constituted (or has a portion constituted) such that the protrusion height of the convex portion at a first position is larger than that at a second portion distant from the injection bores of the fuel injector, compared with the first position. In other words, the convex portion includes a portion having a protrusion height which is decreased as the portion becomes distant from the injection bores of the fuel injector.

According to the above-explained constitution, the protrusion height of the convex portion can be large at an area adjacent to the injection bores of the fuel injector (i.e. an area corresponding to the root portion of the fuel spray), while the protrusion height of the convex portion can be small (or the convex portion can be omitted) at an area distant from the injection bores of the fuel injector (i.e. an area corresponding to the leading portion of the fuel spray and adjacent to the side wall of the combustion chamber).

In this regard, as the protrusion height of the convex portion becomes large, the above-mentioned "pressure difference" becomes large and therefore the "flow of the gas from the convex portion space toward the recessed portion space" becomes strong. Therefore, according to the above-explained constitution, the diffusion of the root portion of the fuel spray can be sufficiently facilitated by using the strong "flow of the gas from the convex portion space toward the recessed portion space". Further, in the case that a swirl is formed adjacent to the side wall of the combustion chamber, as the protrusion height of the convex portion is small, the degree of the restriction of the formation of the swirl is small. Therefore, according to the above-explained constitution, the degree of the restriction of the formation of the swirl can be small and as a result, the diffusion of the leading portion of the fuel spray can be sufficiently facilitated by using the strong swirl. That is, according to the above-explained constitution, the diffusion of the entire of the fuel spray can be sufficiently facilitated.

Further, in the above-explained direct-injection type engine according to the invention, it is preferred that the top portion of the convex portion has a R-shape along the extending direction of the convex portion and the convex portion is constituted such that a radius of the R-shape of the convex portion at a third position is smaller than that at a fourth position distant from the injection bores of the fuel injector, compared with the third position. In other words, the convex portion has a portion having a radius of the R-shape which is increased as the portion becomes distant from the injection bores of the fuel injector.

According to the above-explained constitution, the radius of the R-shape can be small at the area adjacent to the injection bores of the fuel injector (i.e. the area corresponding to the root portion of the fuel spray), while the radius of the R-shape can be large at the area distant from the injection bores of the fuel injector (i.e. the area corresponding to the leading portion of the fuel spray and adjacent to the side wall of the combustion chamber).

In this regard, as the radius of the R-shape is small, the rapid change of the velocity of the "flow of the gas from the convex portion space toward the recessed portion space" easily occurs. In other words, the Reynolds number becomes large. As a result, the turbulence of the gas (the degree of the turbulent flow) can be further facilitated. Therefore, according to the above-explained constitution, the diffusion of the root portion of the fuel spray can be facilitated in the longitudinal direction by also using the strong turbulence of the gas. Further, as the radius of the R-shape is large, the convex portion is easily formed. Therefore, according to the above-explained constitution, a portion of the convex portion distant from the injection bores of the fuel injector (i.e. a portion corresponding to the leading portion of the fuel spray) can be easily formed.

Further, in the above-explained direct-injection type engine according to the invention, it is preferred that a straight port positioned toward a central portion of the combustion chamber and a helical or tangential port positioned so as to form a swirl adjacent to the side wall of the combustion chamber are provided as intake ports.

Conventionally, there is a known technique that two ports such as helical or tangential ports are used as intake ports and one of the ports is positioned so as to form a swirl in the central portion of the combustion chamber, while the other is positioned so as to form a swirl adjacent to the side wall of the combustion chamber.

On the other hand, as explained above, in the direct-injection type engine according to the invention, the diffusion of the root portion of the fuel spray can be facilitated at the area adjacent to the injection bores of the fuel injector (i.e. the area corresponding to the root portion of the fuel spray) by using the "flow of the gas from the convex portion space toward the recessed portion space". Accordingly, there is less need to positively form the swirl at the area adjacent to the injection bores of the injector (i.e. at the central portion of the combustion chamber). Accordingly, the port positioned toward the central portion of the combustion chamber can be a straight port having a small intake resistance (a small pumping loss).

The above-explained constitution is based on this knowledge. According to this, the intake resistance can be totally decreased, compared with the case that two helical or tangential ports are used as explained above. As a result, the fuel consumption of the engine is improved. Further, the amount of the air introduced into the cylinder during the high engine load can be increased and as a result, the maximum output of the engine is increased.

BRIEF DESCRIPTION OF THE DRAWINGS

FIG. 4(a) is an expanded view of a periphery of a convex portion illustrated at the lowermost position among eight convex portions in FIG. 3(b). FIG. 4(b) is a sectional view of the land portion cut along a line 2-2 of FIG. 4(a).

FIGS. 5(a) and 5(b) are views corresponding to FIGS. 4(a) and 4(b), respectively and showing a condition that a short time has elapsed from the condition shown in FIGS. 4(a) and 4(b) (a condition that the compression by the piston proceeds).

BEST MODE FOR CARRYING OUT THE INVENTION

Figure 1:
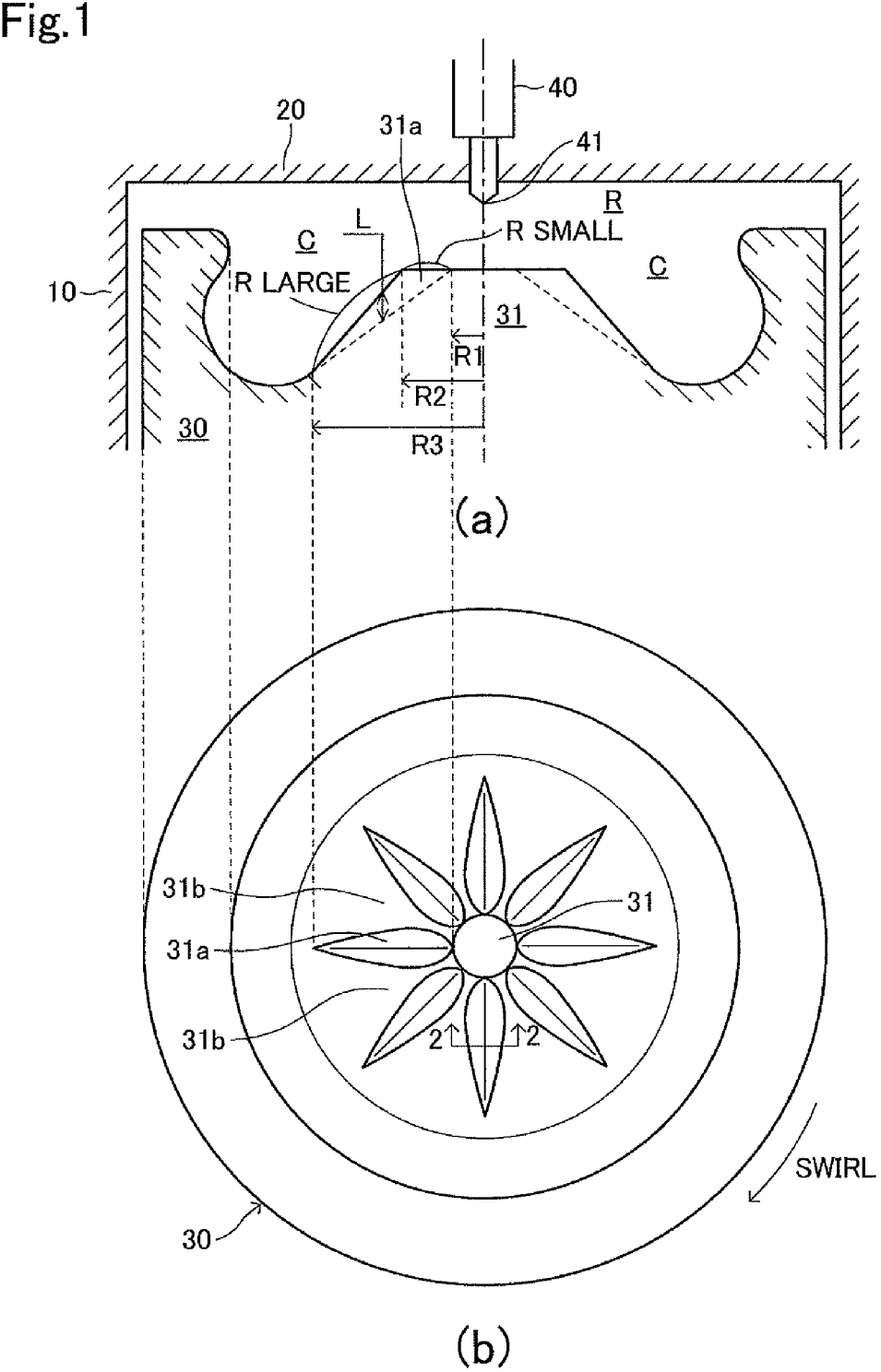
FIG. 1(a) is a longitudinal sectional view showing a general constitution around a combustion chamber of an embodiment of a direct-injection type engine according to the invention.
FIG. 1(b) is a plane view (a top view) of a piston of the engine.

Below, embodiments of a direct-injection type engine (a diesel engine) according to the invention will be explained by referring to the drawings.

FIG. 1(a) is a longitudinal sectional view showing a general constitution around a combustion chamber of this embodiment. FIG. 1(a) is a plane view (a top view) of a piston. In this engine, an inner wall (a cylindrical surface) of a cylinder 10, an inner wall (a plane surface) of a cylinder head portion 20 and a top portion of a piston 30 define and form a combustion chamber R.

A fuel injector 40 for injecting fuel from injection bores 41 directly into the combustion chamber R is secured in the cylinder head portion 20. The fuel injector 40 is positioned such that an axis of the fuel injector is aligned with a central axis of the cylinder 10 (or the piston 30).

A cavity C (a recess) is formed in the top portion of the piston 30, coaxially with the piston 30 and a truncated-cone-shaped land portion 31 (a protruded portion) is formed on a bottom surface of the cavity C, coaxially with the piston 30.

Figure 2:
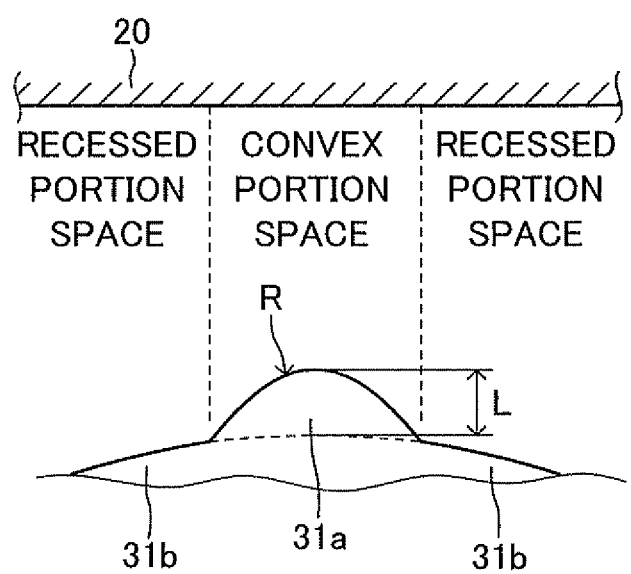
FIG. 2 is a sectional view of a land portion cut along a line 2-2 of FIG. 1(b).

As shown in FIGS. 1(a), 1(b) and 2 (which is a sectional view of the land portion 31 cut along a line 2-2 of FIG. 1(b)), in the planar view (the top view), eight convex portions 31a are radially formed in a tapered surface (a conical surface) of the land portion 31 such that the convex portions 31a extends radially (within a range between radius R1 and radius R3) and are equally spaced apart from each other by 45 degrees.

Below, a portion between the adjacent convex portions 31a and 31a on the tapered surface of the land portion 31 will be referred to as "recessed portion 31b". That is, in the planar view, the eight convex portions 31a and the eight recessed portions 31b are radially alternately (in a staggered manner) formed on the tapered surface of the land portion 31. Further, as shown in FIG. 2, a space between the inner wall of the cylinder head portion 20 and the convex portion 31a will be referred to as "convex portion space" and a space between the inner wall of the cylinder head portion 20 and the recessed portion 31b will be referred to as "recessed portion space".

As shown in FIGS. 1(a) and 2, when a height of the protrusion of the convex portion 31a from the tapered surface of the land portion 31 in the longitudinal direction (the direction parallel to the central axis of the piston 30) is defined as "protrusion height L", the protrusion height L becomes large as it becomes distant from the injection bores 41 within the range between the radius R1 and radius R2 and the protrusion height L becomes small as it becomes distant from the injection bores 41 within the range between radius R2 and radius R3. That is, each convex portion 31a is constituted such that the protrusion height L of the convex portion 31a at a first position (at a position near the radius R2 within the range between the radius R2 and the radius R3) is larger than the protrusion height L of the convex portion 31a at a second position distant from the injection bores 41 of the fuel injector 40, compared with the first position (at a position near the radius R3 within the range between the radius R2 and the radius R3). As explained above, each convex portion 31a has a portion having a maximum protrusion height L (corresponding to the radius R2) between the both ends thereof in the extending direction thereof.

Further, as shown in FIG. 2, the top portion of each convex portion 31a has a R-shape along the extending direction of the convex portion 31a (along the range between the radius R1 and the radius R3) and as shown FIG. 1, the radius of the R-shape within the range between the radius R1 and the radius R2 is smaller than that within the range between the radius R2 and the radius R3. That is, each convex portion 31a is constituted such that the radius of the R-shape of the convex portion 31a at a third position (at a position within the range between the radius R1 and the radius R2) is smaller than the radius of the R-shape of the convex portion 31a at a fourth position distant from the injection bores 41 of the fuel injector 40, compared with the third position (at a position within the range between the radius R2 and the radius R3).

FIGS. 3(a) and 3(b) are views corresponding to FIGS. 1(a) and 1(b), respectively and showing a condition that a fuel spray is formed by the fuel injection from the fuel injector 40. FIG. 4(a) is an expanded view showing the periphery of the lowermost convex portion 31a among the eight convex portions 31a in FIG. 3(b) and FIG. 4(b) is a sectional view of the land portion 31 cut along the line 2-2 of FIG. 4(a). It should be noted that as shown in FIG. 3(b), in this example, a swirl is formed adjacent to a side wall of the combustion chamber R (a side wall of the cavity C) in the direction shown therein (in the circumferential direction) by the adjustment, etc. of the shape of an intake port.

Figure 3:
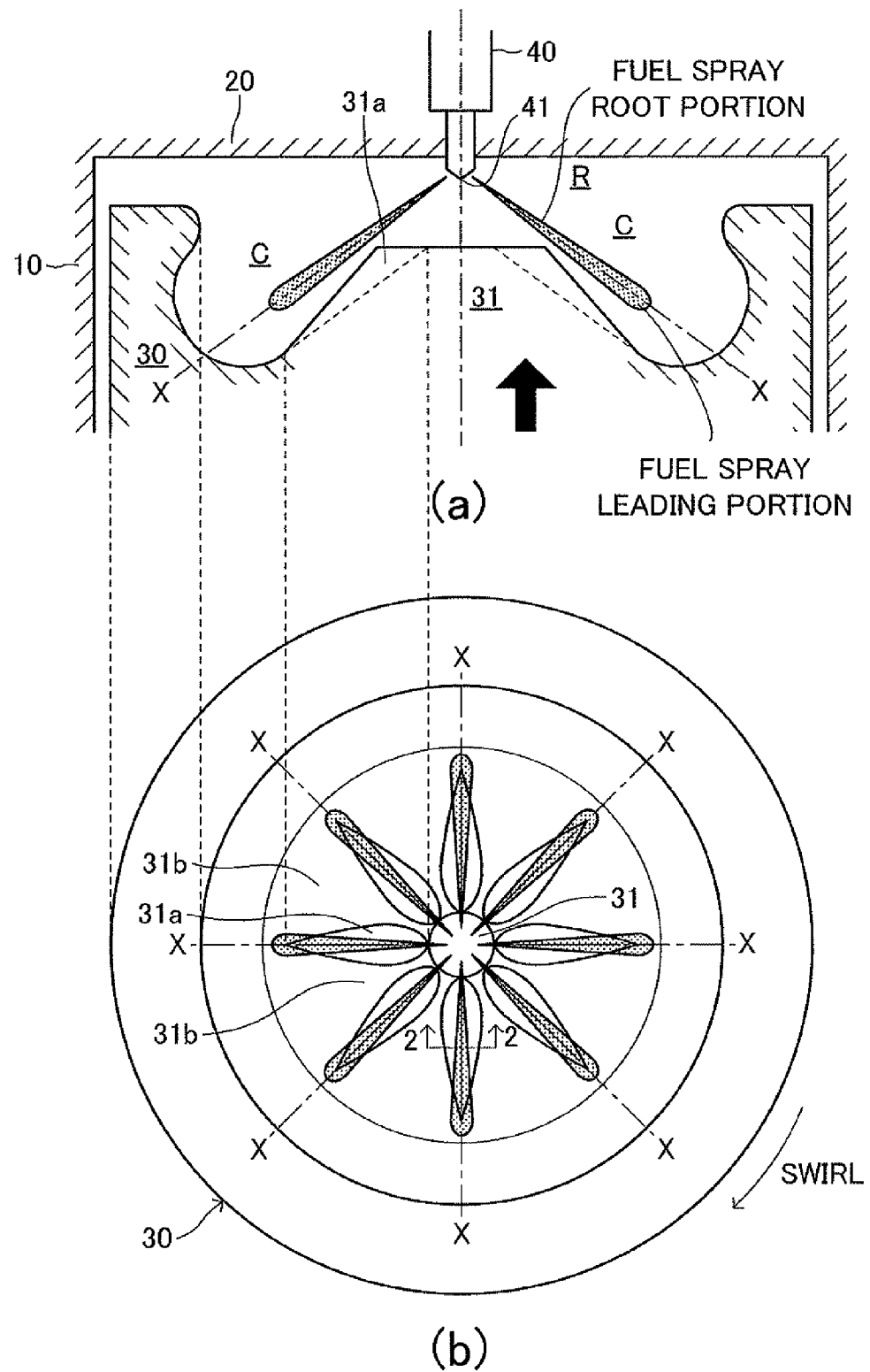
FIGS. 3(a) and 3(b) are views corresponding to FIGS. 1(a) and 1(b), respectively and showing a condition that a fuel spray is formed by a fuel injection from a fuel injector.

As shown in FIGS. 3 and 4, in this example, a fuel injection is performed during the latter half of a compression stroke that the piston 30 moves upwards (concretely, at a time adjacent to the top dead center of the compression stroke). Eight injection bores 41 are provided in the fuel injector 40 such that each injection bore 41 is orientated in a direction along the extending direction of each corresponding convex portion 31a. As a result, in the planar view, eight fuel sprays are radially formed and the axis X of each fuel spray is orientated in the extending direction of the corresponding convex portion 31a (in the direction along the tapered surface of the land portion 31). Thereby, as shown in FIGS. 4(a) and 4(b), each fuel spray moves forward through the corresponding convex portion space along the extending direction of the corresponding convex portion 31a.

Below, an action and an effect of the embodiment of the direct-injection type engine (the diesel engine) according to the invention constituted as explained above will be explained by referring to FIGS. 5(a) and 5(b). FIGS. 5(a) and 5(b) are views corresponding to FIGS. 4(a) and 4(b), respectively and showing a condition that a short time has elapsed from the condition shown in FIGS. 4(a) and 4(b) (a condition that the compression by the piston proceeds).

As explained above, the convex portions 31a and the recessed portions 31b are alternately (in a staggered manner) formed in the top portion of the piston 30 (more concretely, on the tapered surface of the land portion 31). Thereby, a ratio of the volume of the convex portion space relative to the volume of the recessed portion space is progressively decreased as the top portion of the piston 30 approaches to the inner wall of the cylinder head portion 20 during the compression stroke.

As a result, the pressure in the convex portion space is increased, compared with the pressure in the recessed portion space in each convex portion space, a flow of the gas occurs from the convex portion space toward the two recessed portion spaces adjacent to each other (that is, in the circumferential and traverse directions) by the pressure difference (see an arrow in FIG. 5(b)). Accordingly, when the fuel injection is performed during the latter half of the compression stroke as explained above, each fuel spray shown in FIG. 4 is circumferentially expanded by the above-mentioned "flow of the gas from the convex portion space toward the recessed portion space" (see arrows in FIGS. 5(a) and 5(b)).

In this regard, as explained above, the protrusion height L of the convex portion 31a is large at an area adjacent to the injection bores 41 of the fuel injector 40 (i.e. at an area corresponding to the root portions of the fuel sprays), while the protrusion height L of the convex portion 31a is small at an area distant from the injection bores 41 (i.e. at an area corresponding to the leading portions of the fuel sprays and adjacent to the side wall of the combustion chamber R (the side wall of the cavity C)). In addition, as the protrusion height L of the convex portion 31a becomes large, the above-mentioned "pressure difference" becomes large and the "flow of the gas from the convex portion space toward the recessed portion space" becomes strong.

Accordingly, in each fuel spray, the root portion thereof is especially circumferentially positively expanded although the root portion has a large density of the fuel and therefore the diffusion thereof is difficult to be facilitated. As a result, the diffusion of the root portion of the each fuel spray can be positively facilitated by using the "flow of the gas from the convex portion space toward the recessed portion space" without using the impingement of the root portion of the fuel spray on the wall surface.

On the other hand, as the protrusion height L of the convex portion 31a becomes small, the degree of the restriction of the formation of the swirl becomes small. Accordingly, according to the above-explained constitution, the degree of the restriction of the formation of the swirl adjacent to the side wall of the combustion chamber R (the side wall of the cavity C) becomes small. As a result, the diffusion of the leading portion of each fuel spray can be sufficiently facilitated by using the strong swirl (see FIG. 5(a)). Therefore, according to the above-explained constitution, the diffusion of the entire of each fuel spray can be sufficiently facilitated.

As a result, the increase of the amount of the discharge of the unburned hydrocarbon at the cold engine start condition, etc. and the increase of the amount of the discharge of the smoke at the complete warmed engine condition, etc., which are derived from the insufficient facilitation of the diffusion of the fuel spray, can be restricted.

In addition, as explained above, the radius of the R-shape of the top portion of each convex portion 31a is small within the range between the radius R1 and the radius R2 (at the area corresponding to the root portions of the fuel sprays). In this regard, as the radius of the R-shape is small, the rapid change of the velocity of the "flow of the gas from the convex portion space toward the recessed portion space" can easily occur. In other words, the representative length becomes large and therefore the Reynolds number becomes large. As a result, the turbulence of the gas (the degree of the turbulent flow) is further facilitated. Therefore, according to the above-explained constitution, the diffusion of the root portions of the fuel sprays can be sufficiently facilitated in the longitudinal direction by also using the strong turbulence of the gas.

Figure 6:
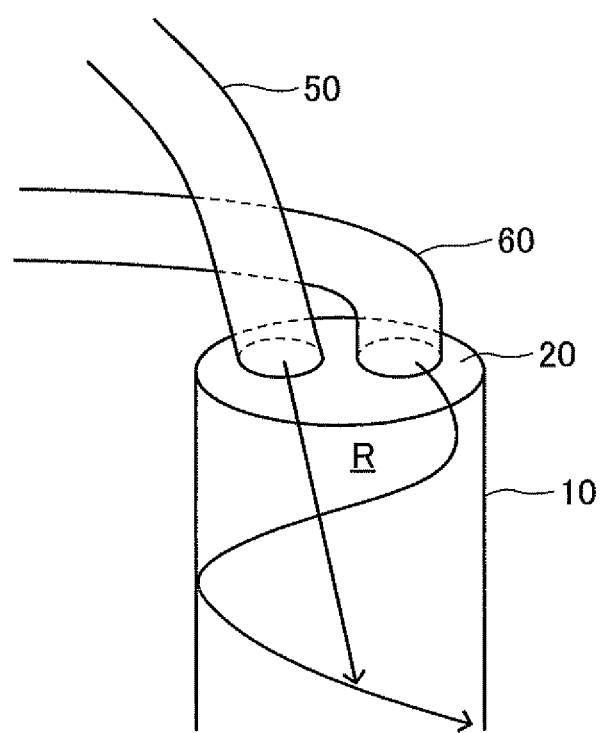
FIG. 6 is a view showing a condition that two intake ports, i.e. a straight port and a helical or tangential port are used as intake ports.
Figure 7:
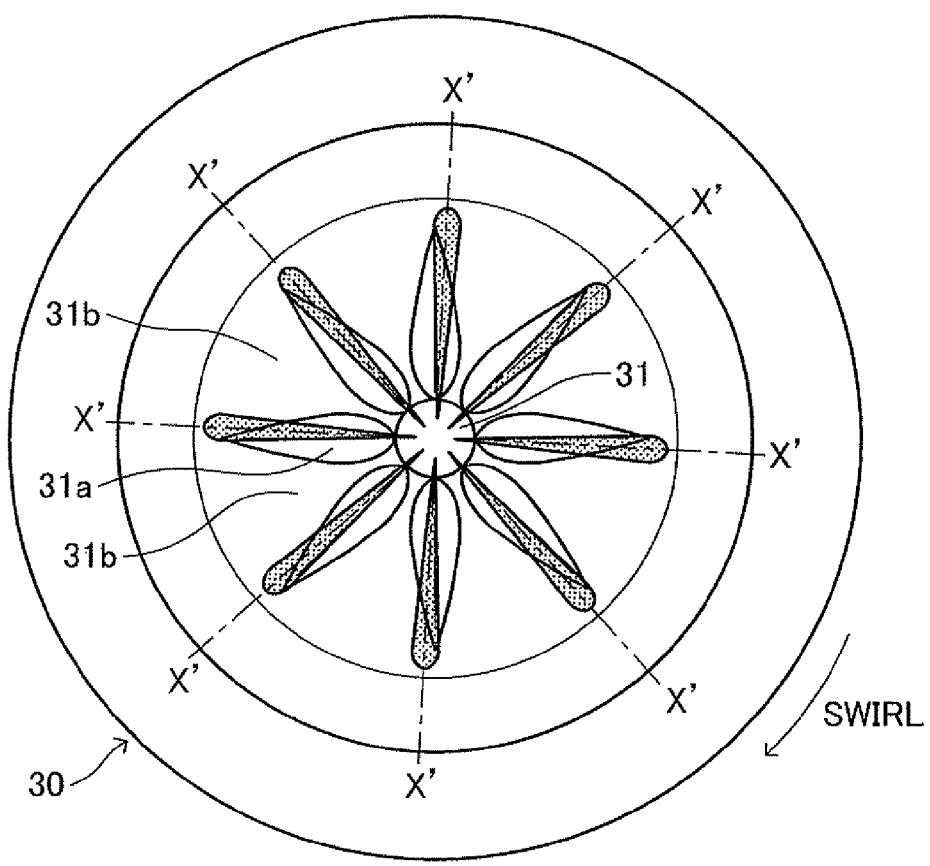
FIG. 7 is a view corresponding to FIG. 3(b) and regarding a modification of the embodiment of the direct-injection type engine according to the invention.
Figure 8:
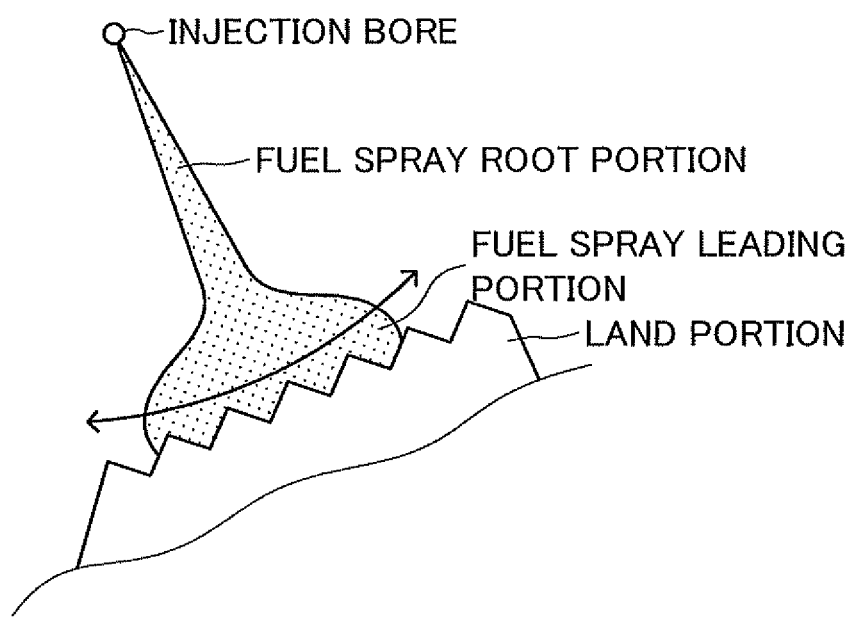
FIG. 8 is a view showing an aspect that a diffusion of a leading portion of the fuel spray proceeds by the leading portion of the fuel spray impinging on a top surface of the land portion formed in a cavity formed in a top portion of the piston.

Further, in order to form the swirl adjacent to the side wall of the combustion chamber R (the side wall of the cavity C), in this embodiment, as shown in FIG. 6, two intake ports, i.e. a straight port 50 positioned orientating toward a central portion of the combustion chamber R and a helical or tangential port 60 positioned to form the swirl adjacent to the side wall of the combustion chamber R, are provided as intake ports.

The above-explained swirl is formed adjacent to the side wall of the combustion chamber R (the side wall of the cavity C) by the action of the helical or tangential port 60. Thereby, as explained above, the diffusion of the leading portion of each fuel spray is facilitated.

On the other hand, in this example, as explained above, the diffusion of the root portion of each fuel spray can be sufficiently facilitated by using the "flow of the gas from the convex portion space toward the recessed portion space" and the "turbulence of the gas". Accordingly, there is less need to positively form the swirl at the central portion of the combustion chamber R corresponding to the root portion of each fuel spray. Therefore, in this example, as a port positioned orientating toward the central portion of the combustion chamber R, the straight port 50 having a small intake resistance (a small pumping loss) is employed.

Thereby, the intake resistance can be totally decreased, compared with the case that a helical or tangential port is employed as a port positioned orientating toward the central portion of the combustion chamber R. As a result, the fuel consumption of the engine is improved. Further, the amount of the air introduced into the combustion chamber R during the intake stroke at the high engine load can be increased and as a result, the maximum output of the engine is increased.

The invention is not limited to the above-explained embodiment and therefore various modifications can be employed within the scope of the invention. For example, in the above-explained embodiment, as shown in FIG. 3(b), in the planar view, the convex portions 31a are (radially) positioned such that the axis X of each fuel spray aligns with the extending direction of the corresponding convex portion 31a (in the radial direction), however, in the planar view, the convex portions 31a may be (radially) positioned such that the axis X' of each fuel spray is shifted toward the direction of the swirl (in the circumferential direction) by a predetermined angle (which is larger than 0), compared with the extending direction of the corresponding convex portion 31a (the radial direction).

Further, in the above-explained embodiment, the diesel engine is employed as the engine, however, a spark ignition type engine which uses petrol (petrol including alcohol component is included) and performs the fuel injection during the latter half of the compression stroke, may be employed as the engine.

Further, in the above-explained embodiment, the convex portions 31a (and the recessed portions 31b) are formed on the tapered surface of the land portion 31 formed on the bottom surface of the cavity C formed in the top portion of the piston 30, however, in the case that no cavity is formed in the top portion of the piston, convex portions (and recessed portions) may be formed on the top surface (the planar surface) of the piston. Further, in the case that no cavity is formed on the top surface of the piston, convex portions (and recessed portions) may be formed on the tapered surface of the truncated-cone-shaped land portion (the protruded portion) formed on the top surface (the planar surface) of the piston, coaxially with the axis of the piston.

Further, in the above-explained embodiment, in the planar view, eight fuel sprays are radially formed, however, for example, in the planar view, only one fuel spray having an axis along the extending direction may be formed. In this case, in the planar view, only one convex portion is formed such that the axis of the fuel spray aligns with the extending direction of the convex portion (the radial direction). Further, the number of the fuel sprays may be other than one and eight.

Further, in the above-explained embodiment, the protrusion height L of each convex portion 31*a* changes, depending on the radial position (the distance from the injection bore), however, the protrusion height L of each convex portion 31*a* may be constant, independently of the radial position.

In addition, in the above-explained embodiment, the radius of the R-shape of the top portion of each convex portion 31*a* changes, depending on the radial position (the distance from the injection bore), however, the radius of the R-shape of the top portion of each convex portion 31*a* may be constant, independently of the radial position.

The invention claimed is:

1. A direct-injection type engine comprising:
   a combustion chamber defined and formed by at least a cylinder head portion and a top portion of a piston; and
   a fuel injector for injecting fuel directly into said combustion chamber;
   wherein a cavity recessed downwards is formed in said top portion of said piston, coaxially with said piston, a land portion protruded upwards is formed on a central portion of a bottom surface of said cavity, coaxially with said piston such that said land portion has a conical side surface approaching to a central axis of said piston at the upper side of said conical side surface, and a plurality of convex portions radially extending from said central axis of said piston when viewing from the top, are formed on said side surface of said land portion;
   wherein said fuel injector has a plurality of injection bores positioned at the upper side of said combustion chamber and said injection bores are positioned such that the axes of fuel sprays having the same number as that of the injection bores and diffused from said injection bores follow said side surface of said land portion toward said cavity from said corresponding injection bore and spread radially about said central axis of said piston when viewing from the top; and
   wherein the number of said convex portions are the same as that of said fuel sprays and the extending direction of each convex portion is aligned with the direction of the central axis of said corresponding fuel spray when viewing from the top.

2. The direct-injection type engine as set forth in claim 1, wherein each convex portion is constituted to have a portion that a protruding height of said convex portion at a first position is larger than that at a second position lower than said first position.

3. The direct-injection type engine as set forth in claim 1, wherein said top portion of each convex portion has a R-shape along the extending direction of said convex portion and is constituted to have a portion that a radius of said R-shape of said convex portion at a third position is smaller than that at a fourth position lower than said third position.

4. The direct-injection type engine as set forth in claim 1, wherein a straight port positioned orientating to a central portion of said combustion chamber and one of a helical port and a tangential port positioned to form a swirl adjacent to a side wall of said combustion chamber are provided as intake ports.

* * * * *